United States Patent [19]

Miyahara

[11] Patent Number: 5,183,609

[45] Date of Patent: Feb. 2, 1993

[54] METHOD OF MANUFACTURING CERAMIC HONEYCOMB-STRUCTURAL BODY

[75] Inventor: Kazuhiro Miyahara, Nagoya, Japan

[73] Assignee: NGK Insulators, Ltd., Japan

[21] Appl. No.: 397,499

[22] PCT Filed: Feb. 10, 1989

[86] PCT No.: PCT/JP89/00139

§ 371 Date: Aug. 18, 1989

§ 102(e) Date: Aug. 18, 1989

[87] PCT Pub. No.: WO89/07584

PCT Pub. Date: Aug. 24, 1989

[30] Foreign Application Priority Data

Feb. 10, 1988 [JP] Japan .................. 63-27616

[51] Int. Cl.$^5$ .................. B29C 65/00; F27D 21/00
[52] U.S. Cl. .................. 264/44; 264/66; 264/177.12
[58] Field of Search .................. 264/44, 65, 177.11, 264/177.12, 63, 66

[56] References Cited

U.S. PATENT DOCUMENTS

| | | | |
|---|---|---|---|
| 3,932,310 | 1/1976 | Turner | 264/44 |
| 4,055,614 | 10/1977 | Morikawa et al. | 264/59 |
| 4,550,005 | 10/1985 | Kato | 264/177.12 |
| 4,680,153 | 7/1987 | Kinder et al. | 264/44 |
| 4,795,598 | 1/1989 | Billiet | 264/63 |

FOREIGN PATENT DOCUMENTS 54-138005 10/1979 Japan .
54-14474 11/1980 Japan .

OTHER PUBLICATIONS

McFadden et al., American Ceramic Society Bulletin, 41, [3], 160–164, Oct. 1961.

Primary Examiner—James Lowe
Assistant Examiner—Christopher A. Fiorilla
Attorney, Agent, or Firm—Parkhurst, Wendel & Rossi

[57] ABSTRACT

A process of producing a honeycomb-structural body capable of preventing abrupt heat generation of molding aids and a pore-forming agent by increasing or decreasing the oxygen concentration in the firing atmosphere for the temperature region wherein the pore-forming agent and the molding aids hardly thermally decompose or easily thermally decompose, respectively; or promoting the firing by controlling the oxygen content in the firing atmosphere to be increased for the temperature region wherein the pore-forming agent and the molding aids are hardly burning, so as to reduce the temperature difference existing between the interior or exterior of honeycomb-structural body during firing, thereby to perform an optimal firing in a good condition to attain an uniformity of the specific properties in the interior and the exterior of such a honeycomb structural body by reducing the temperature difference of the same. Furthermore, since it is not required to make the rate of firing lower during firing operation, it is possible to shorten the firing schedule and the efficiency of production is promoted. Accordingly, the process according to the invention is useful in particular for the production of a ceramic honeycomb-structural body.

1 Claim, 1 Drawing Sheet

METHOD OF MANUFACTURING CERAMIC HONEYCOMB-STRUCTURAL BODY

TECHNICAL FIELD OF THE INVENTION

The present invention relates to a method of manufacturing a ceramic honeycomb-structural body, and more particularly to a method for firing a honeycomb-structural body of ceramic material.

TECHNICAL BACKGROUND OF THE INVENTION

Heretofore, it has been a common practice in the preparation of a honeycomb-structural body that a green body of ceramic mixture prepared by mixing ceramic material and molding aids and/or a pore-forming agent was molded firstly to a desired form in a forming mold and then extruded to obtain a desired honeycomb-structural body. The thus-prepared mold was fired in a continuous-feed furnace or in a periodic kiln under a predetermined temperature to attain an ultimate ceramic honeycomb-structural body.

In the firing of such a honeycomb-structural body, several admixtures are essentially employed to be mixed into the ceramic material, such as an organic binder, a surface-active agent (e.g., methyl cellulose, carboxymethyl cellulose, polyvinyl alcohol, starch paste, wheat flour, glycerol), a molding aids (e.g., wax and the like), and a pore-forming material (e.g., graphite, starch, sawdust and the like, all of which exhibit a differential specificity, as reviewed below. More particularly, the molding auxiliaries and pore-forming material may generally suffer from an inconvenience that they hardly can be burnt off (i.e., thermally decomposed) by heating from the outside of the honeycomb-structural body during the firing operation, while once they are burnt, they may be fired abruptly to generate heat. Additionally, each of such molding aids has a different ignition temperature. For this reason, there may possibly generate a substantial difference in the temperatures between the interior and the exterior of such a honeycomb-structural body. With such a differential temperature, it is possible that cracks may generate in the inside or end surface of the honeycomb-structural body or melting may occur in the interior thereof. Additionally, owing to a substantial difference in the degree of firing of such molding auxiliaries and/or pore-forming agent existing in the interior and the exterior of the honeycomb structure, the properties of such a honeycomb-structural body may possibly be non-uniform between the interior and the exterior of the structure. For instance, if a pore-forming agent in a certain area has burned abruptly, it generates irregularly greater pores in the specific area where there was such an abrupt burning. In this respect, therefore, it is generally the practice in the firing operation of such a ceramic green body to employ a smaller rate of temperature rising for the purpose of suppressing an abrupt firing in the interior of a ceramic green body in an attempt to prevent the generation of cracks and interior melting of such a green body and the resulting non-uniformity in the properties between the interior and the exterior of the fired products. However, with a lower temperature rising in the firing operation, a problem results in that the schedule of operation may naturally be extended, and the efficiency of production may be adversely affected.

SUMMARY OF THE INVENTION

In view of the foregoing drawbacks in the prior art, an object of the present invention is to obviate the above-mentioned problems by providing an efficient firing process for the manufacture of a ceramic honeycomb body.

In the firing process for the manufacture of a ceramic honeycomb-structural body in a predetermined atmosphere and at a specified temperature, an improvement proposed according to this invention is characterized in that the concentration of oxygen in the firing atmosphere may be increased or decreased in connection with the range of temperatures where molding aids or a pore-forming agent may be hard to thermally decompose or where such agents may be easy to thermally decompose.

According to the present invention, it is arranged such that the concentration of oxygen in the firing atmosphere is increased in the range of temperatures where molding aids or a pore-forming agent may hardly be burned so that such agents may be forced to be burned on one hand, and the concentration of oxygen in the firing atmosphere is decreased in the range of temperatures where such agents may be fired abruptly so that they may be suppressed from being fired on the other hand. Consequently, there can be attained such advantageous effects that a differential temperature existing between the interior and the exterior of a ceramic honeycomb structure being fired may well be held smaller so that the generation of cracks in the inside and the end surfaces of the structure as well as melting occurring in the interior thereof may efficiently be prevented. The fired product formed according to the claimed invention is uniform in quality and properties throughout all its portions, the interior or exterior. Moreover, as it is not required to decrease the rate of temperature rising during the firing operation, the efficiency in production can improved.

DETAILED DESCRIPTION OF THE PREFERRED EMBODIMENTS

Figure 1:
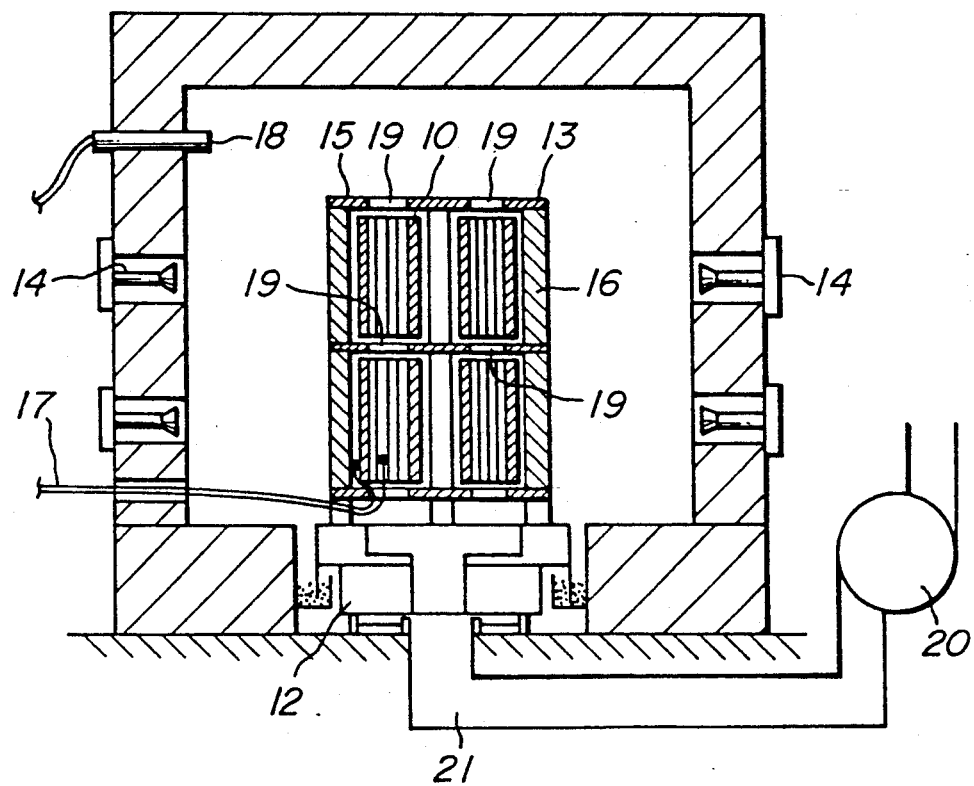
FIG. 1 is a cross-sectional view showing generally the construction of a periodic kiln which can be used for practicing the firing process according to the present invention.

FIG. 1 shows a periodic kiln wherein the following numerals depict the following features:
10: a sample; 11: a periodic kiln; 12: a carriage;
13: a receiving plate; 14: a furnace burner;
16: a direct fire shield plate; 17: a thermocouple; and
18: an oxygen sensor.

In preparation for firing of a ceramic honeycomb-structural body to be manufactured according to the present invention, first, ceramic material of a desired grain size is mixed homogeneously and is then admixed with molding aids and/or a pore-forming agent to obtain a plasticized batch of moldable ceramic material. The thus-prepared batch of plasticized mixture is extrusion molded to a desired shape and is thereafter dried to provide a thus-molded body ready to be fired in a furnace. Next, in accordance with the claimed invention, during the firing step the current concentration of oxygen in the firing atmosphere is adjusted accordingly to a differential temperature between the interior and the exterior of the molded body which is being measured during the firing operation, so that the degree of burning of molding aids and pore-forming agent may be controlled, and so that the prepared molded body may be fired optimally to obtain a desired ceramic honeycomb-structural body. For this arrangement, there are provided at least two thermocouples in appropriate positions of the interior and the exterior of a specific molded article to be fired for the purpose of measuring a differential temperature therebetween. This differential temperature to be measured between the interior and the exterior of the molded material by such thermocouples may be either a positive or negative value. A positive value of differential temperature represents that a temperature in the interior of the body is lower than that in the exterior of the body out of the range of temperatures that a molding aids and a pore-forming agent may be burned, while a negative value represents that an interior temperature is higher than an exterior temperature of the body owing to heat generated from such admixed agents in the temperature range that they are being burned, respectively. More specifically, the measuring of a differential temperature is adapted to capture a range where the sense of differential temperature may change, namely, either from the positive to the negative or vice versa to appropriately control the current concentration of oxygen in the firing atmosphere. In practice, the control of such a concentration of oxygen in the atmosphere may be considered by way of the following means.

1) For increasing the current concentration of oxygen in the furnace:
   ① increasing the air-fuel ration in a furnace burner by the introduction of an increased diffusion rate of air; and
   ② adding the current percentage of oxygen gas in the combustion gas to be fed to the burner.

2) For decreasing the current concentration of oxygen in the furnace:
   ① decreasing the air-fuel ration in a furnace burner by decreasing the current quantity of combustion gas fed to the burner; and
   ② adding nitrogen gas to the combustion gas to be fed to the burner.

Additionally, for control of the current concentration of oxygen, an oxygen sensor is provided in an appropriate position in the atmosphere of the furnace. Also, in consideration of the fact that as a pore-forming agent is admixed thoroughly in the molded ceramic body, it has generally a limited chance to contact with oxygen in the firing atmosphere so that it is rather hard for it to be fired during the firing operation, and that once it is fired, it can hardly be extinguished, it is then preferred to provide the firing atmosphere with an excessive concentration of oxygen.

In practice, it is preferable to employ appropriate molding aids selected from the group consisting of an organic binder, a surface-active agent, waxes, such as, for example, methyl cellulose, carboxymethyl cellulose, poly(vinyl alcohol), starch paste, wheat flour, glycerol. and an appropriate pore-forming agent selected from the group consisting of graphite, starch, sawdust.

EXAMPLE 1

Ceramic materials such as kaolin and alumina are prepared to be mixed together in an appropriate mixing ratio to obtain a mullite composition, to which glycerol or a surface-active agent is admixed as molding aids, which is to be plasticized, molded and then dried in the following steps for attaining a desired molded article. The thus-prepared molded article 10 was put onto a top plate 13 positioned on a traveling carriage 12, which is movable through the interior of a tunnel furnace 11, in the manner as shown in FIG. 1, and then subjected to a firing operation under the conditions shown in Table 1. In the firing operation, while a plurality of burners 14 mounted in the opposed side walls of the furnace were provided as heating means, it is preferred that solid shield plates 16 made of mullite-containing material are arranged in position between outer posts of the top plate 13 so that a plurality of prepared shaped articles or ceramic honeycomb-structural bodies 10 are not directly subjected to firing from the burners.

Also, there were provided two thermocouples 17 at appropriate positions in the inside and the outer surface of one of the prepared shaped articles 10 disposed within the tunnel furnace 11. Further, an oxygen sensor 18 was placed in the side wall of the furnace in such a manner that its sensing head extends therethrough into the interior space of the furnace 11.

Preferably, it may be arranged such that there are provided a plurality of openings 19 in receiving plates 15 which oppose each of the honeycomb-structural bodies 10 disposed thereupon so that the atmosphere of the furnace may be assisted to pass efficiently through the interior of the honeycomb-structural bodies 10, and also provided an exhaust passageway 21 extending through the carriage 12 and the furnace bottom to an exhaust blower for directing a mass of atmosphere to the outside so than no substantial difference in temperatures may exist between the interior and the exterior of the honeycomb-structural body.

With this arrangement, the furnace atmosphere was heated to the maximum temperature of 1400° C. and held at this temperature for two and half hours with the prepared shaped article disposed in position, and then cooled at the cooling rate of 150° C./hr.

The results obtained from this firing operation are shown in Table 1.

TABLE 1

| Sample No. | | Product by the invention 1 | 2 | Reference product 3 |
|---|---|---|---|---|
| Composition of fired product | | Mullite | Mullite | Mullite |
| Starting material | | Kaolin & Alumina | Kaolin & Alumina | Kaolin & Alumina |
| Molding aids | | Glycerol | Surfactant | Glycerol |
| Pore-forming agent | | None | None | None |
| Temperature rising rate (°C./hr) | 100~500° C. | 65 | 65 | 50 |
| | 100~1200° C. | 100 | 100 | 100 |
| $O_2$ Concentration (%) | 200~300° C. | 10 | 10 | 19 |
| | 500~800° C. | 15 | 15 | 15 |
| | 800~1000° C. | 12 | 12 | 12 |
| Range where differential temperature between product in & out is negative (°C.) | When molding aids fired | 200~400 | 150~350 | 200~300 |
| | When pore-forming agent fired | None | None | None |
| Absolute differential temperature under above condition (Max) (°C.) | When molding aids fired | 20 | 30 | 100 |
| | When pore-forming agent fired | None | None | None |
| Crack generating rate (%) | | 0 | 0 | 55 |
| Interior melts generating rate (%) | | 0 | 0 | 0 |

TABLE 1-continued

| Sample No. | Product by the invention | | Reference product |
|---|---|---|---|
| | 1 | 2 | 3 |
| Difference in bores in/out product (μ) | 0.5 | 1.0 | 0.5 |
| Evaluation | ○ | ○ | X |

As is evaluated from Table 1, in the case that the oxygen concentration in the furnace atmosphere is not controlled as in the conventional manner, it is found that the differential temperature between the interior and the exterior of the molded shaped article turned to be a negative value in the range of temperatures from 200° to 300° C. owing to heat generated from the fired molding aids, and that its absolute differential temperature was as large as 100° C. maximum. In contrast, however, with the Samples Nos. 1 and 2 processed with the oxygen concentration of 10% in that range of temperatures according to the present invention, it is noted that the negative range of temperatures were from 200° to 400° C. and from 150° to 350° C. respectively, and also its absolute differential temperature was as small as 20° C. and 30° C. maximum, respectively.

From the visual check-up of thus-fired products processed under such conditions for the crack generation rate (%), the interior melt generation rate (%) and the difference in bores formed in the interior and the exterior of the products (μ), it was observed that the products according to the present invention turned out with no generation of cracks, in contrast to the case of a product compared with the crack generating rate of 55%.

EXAMPLE 2

Ceramic materials such as talc, kaolin and alumina are prepared to be mixed together with an appropriate mixing ratio to obtain a cordierite composition, to which mixture starch paste or methyl cellulose is admixed as molding aids, and further with sawdust or graphite as a pore-forming agent, which is to be plasticized, molded and then dried in the following steps for attaining a desired molded shaped article. The thus-prepared shaped article was mounted onto the receiving plate in the interior of a tunnel furnace 11 in the same manner as in the Example 1, and then subjected to the firing operation under the conditions shown in Table 2. In the firing operation, the furnace atmosphere was raised to the maximum temperature of 1350° C. and held at this temperature for six hours with the prepared shaped article disposed in position, and then cooled off. The results obtained from this firing operation are shown in Table 2.

TABLE 2

| Sample No. | | Product by the invention | | Reference product |
|---|---|---|---|---|
| | | 1 | 2 | 3 |
| Composition of fired product | | Cordierite | Cordierite | Cordierite |
| Starting material | | Talc, Kaolin & Alumina | Talc, Kaolin & Alumina | Talc, Kaolin & Alumina |
| Molding aids | | Starch paste | Methyl cellulose | Starch paste |
| Pore-forming agent | | Sawdust | Graphite | Sawdust |
| Temperature rising rate (°C./hr) | 100~500° C. | 80 | 90 | 60 |
| | 100~1200° C. | 100 | 115 | 60 |
| O₂ Concentration (%) | 200~300° C. | 8 | 6 | 18 |
| | 500~800° C. | 21 | 21 | 15 |
| | 800~1000° C. | 10 | 9 | 12 |
| Range where differential temperature between product in & out is negative (°C.) | When molding aids fired | 200~400 | 200~400 | 200~300 |
| | When pore-forming agent fired | 500~1000 | 500~1000 | 600~900 |
| Absolute differential temperature under above condition (Max) (°C.) | When molding aids fired | 25 | 15 | 120 |
| | When pore-forming agent fired | 30 | 20 | 80 |
| Crack generating rate (%) | | 0 | 0 | 75 |
| Interior melts generating rate (%) | | 0 | 0 | 30 |
| Difference in bores in/out product (μ) | | 2 | 0.5 | 15 |
| Evaluation | | ○ | ⊚ | X |

As is evaluated from Table 2, in the case of products to be compared that the concentration of oxygen in the furnace atmosphere is not controlled as in the conventional manner, it is found that the differential temperature between the interior and the exterior of the molded shaped article turned to be a negative value in the range of temperatures from 200° to 300° C. and from 600° to 900° C., and that its absolute differential temperature was 120° C. and 80° C. maximum, respectively. Also, it is observed that the differential temperature turned to be a positive value in the range of temperature from 500° to 800° C., and that its absolute differential temperature was 80° C. In contrast, however, with the Samples Nos. 1 and 2 processed with the oxygen concentration of 8 and 10%; and 6 and 9% in those ranges of temperatures turning to a negative value according to the present invention, it is noted that their absolute differential temperatures turned out to be 25° C. and 30° C.; and 15° C. and 20° C. maximum, respectively. Also, with the oxygen concentration of 21% in the furnace atmosphere in the range of temperatures where the differential temperature turned to be a positive value, its absolute differential temperature turned to be 50° C.

From the visual check-up of thus-fired products processed under such conditions for the cracks generation rate (%), the interior melts generation rate (%) and the difference in bores formed in the interior and the exterior of the products (μ), it was observed that the products according to the present invention turned out with such a small order of dispersion of bores as of 2 and 0.5μ, respectively, in contrast to the case of a product compared with the difference in bores turned to be as large as 15μ.

While the invention has been described by way of its preferred embodiments with a certain degree of particularity, it is to be understood that the invention is not restricted to the details of such embodiments, but various changes and modifications may be made in the invention by those skilled in the art without departing from the spirit and scope thereof.

As is apparent from the detailed description presented above, according to the firing process for the manufacture of a ceramic honeycomb-structural body of the present invention, the abrupt heat generation of molding aids and/or a pore-forming agent admixed to a ceramic material may be suppressed by decreasing the oxygen concentration in the firing atmosphere in the range of firing temperatures for such an admixed agent on one hand, and in reverse the firing of such an admixed agent may be facilitated by increasing the current concentration of oxygen in the firing atmosphere in the range of temperatures where such an admixed agent can hardly be fired on the other hand. The invention thereby affords a substantial decrease in a differential temperature existing between the interior and the exterior of the burned honeycomb-structural body, which may consequently prevent the occurrence of cracks in the inside or in the end surface of such a product or interior melts thereof. Accordingly, the invention contributes to the attainment of uniformity of the specific properties in the interior and the exterior of such a product, whereby an optimal firing may be afforded.

Moreover, since it is not required to make the temperature rising rate smaller during the firing operation, the schedule of firing operation can be made shorter and the efficiency in production can then be made better accordingly.

I claim:

1. A process for producing a honeycomb-structural body, comprising the steps of:

preparing a mixture of ceramic material and at least one component selected from the group consisting of molding aids and pore-forming agents;

preparing an extrudable green ceramic material from said mixture;

extruding said prepared extrudable green ceramic material to form a honeycomb-structural body;

providing a first thermocouple in a through-hole of said honeycomb-structural body and a second thermocouple outside said honeycomb-structural body; and firing said honeycomb-structural body in a firing atmosphere while minimizing a differential temperature condition measured between interior and exterior portions of said honeycomb-structural body by increasing the oxygen concentration in the firing atmosphere in a range of firing temperatures which is outside a temperature range within which thermal decomposition of said at least one component occurs, and decreasing the oxygen concentration in the firing atmosphere in a range of firing temperatures which corresponds to said temperature range within which thermal decomposition of said at least one component occurs;

wherein said at least one component is substantially completely removed from said honeycomb-structural body during said firing as a result of said increasing and said decreasing oxygen concentration in the firing atmosphere.

* * * * *